United States Patent
Hintzer et al.

(10) Patent No.: US 7,060,772 B2
(45) Date of Patent: Jun. 13, 2006

(54) FLUOROPOLYMERS FROM TETRAFLUOROETHYLENE AND PERFLUORO(ALKOXYALKYL VINYL) ETHER

(75) Inventors: Klaus Hintzer, Kastl (DE); Ralph Kaulbach, Emmerting (DE); Friedrich Kloos, Mainz (DE); Werner Schwertfeger, Altoetting (DE)

(73) Assignee: 3M Innovative Properties Company, Saint Paul, MN (US)

( * ) Notice: Subject to any disclaimer, the term of this patent is extended or adjusted under 35 U.S.C. 154(b) by 66 days.

(21) Appl. No.: 10/363,110

(22) PCT Filed: Sep. 20, 2001

(86) PCT No.: PCT/US01/29302

§ 371 (c)(1),
(2), (4) Date: Feb. 28, 2003

(87) PCT Pub. No.: WO02/28926

PCT Pub. Date: Apr. 11, 2002

(65) Prior Publication Data

US 2004/0024155 A1    Feb. 5, 2004

(51) Int. Cl.
*C08F 16/24*    (2006.01)

(52) U.S. Cl. .................. 526/247; 524/545; 526/252; 526/255

(58) Field of Classification Search ............... 526/247, 526/255, 252; 524/545
See application file for complete search history.

(56) References Cited

U.S. PATENT DOCUMENTS

| | | |
|---|---|---|
| 2,946,763 A | 7/1960 | Bro et al. |
| 2,955,099 A | 10/1960 | Mallouk et al. |
| 3,085,083 A | 4/1963 | Schreyer |
| 3,132,123 A | 5/1964 | Harris, Jr. et al. |
| 3,635,926 A | 1/1972 | Gresham et al. |
| 3,692,843 A | 9/1972 | Resnick |
| 3,817,960 A | 6/1974 | Resnick |
| 3,855,191 A | 12/1974 | Doughty, Jr. et al. |
| 4,029,868 A | 6/1977 | Carlson |
| 4,262,101 A | 4/1981 | Hartwimmer et al. |
| 4,552,925 A | 11/1985 | Nakagawa et al. |
| 4,743,658 A | 5/1988 | Imbalzano et al. |
| 4,864,006 A | 9/1989 | Giannetti et al. |
| 4,920,170 A | 4/1990 | Abe et al. |
| 5,317,061 A * | 5/1994 | Chu et al. .................. 525/200 |
| 5,401,818 A | 3/1995 | Oka et al. |
| 5,473,018 A | 12/1995 | Namura et al. |
| 5,888,424 A * | 3/1999 | Ebnesajjad et al. ...... 252/301.5 |
| 6,153,303 A * | 11/2000 | Namura et al. ............. 428/421 |
| 6,255,536 B1 | 7/2001 | Worm et al. |
| 6,291,054 B1 * | 9/2001 | Thomas et al. ............. 428/141 |
| 6,294,627 B1 * | 9/2001 | Worm et al. ................ 526/247 |
| 2002/0013419 A1 | 1/2002 | Blong et al. |

FOREIGN PATENT DOCUMENTS

| | | |
|---|---|---|
| EP | 0 075 312 A2 | 3/1983 |
| EP | 0 226 668 A1 | 7/1987 |
| EP | 0 257 644 A2 | 3/1988 |
| EP | 0 296 559 A2 | 12/1988 |
| EP | 0 583 481 A1 | 2/1994 |
| EP | 0583481 A1 * | 2/1994 |
| EP | 0 656 912 B1 | 6/1995 |
| EP | 0 731 814 B1 | 9/1996 |
| GB | 1 210 794 | 10/1970 |
| WO | WO 97/07147 | 2/1997 |
| WO | WO 99/41313 | 8/1999 |
| WO | WO 01/49752 A2 | 7/2001 |
| WO | WO 01/49759 A1 | 7/2001 |
| WO | WO-01-49759 A1 * | 7/2001 |

OTHER PUBLICATIONS

*Modem Fluoropolymers*, John Wiley & Sons, 1997, K. Hintzer and G. Löhr, "Melt Processable Tetrafluoroethylene-Perfluoropropylvinyl Ether Copolymers (PFA)", pp. 223.

* cited by examiner

*Primary Examiner*—David W. Wu
*Assistant Examiner*—Henry S. Hu
(74) *Attorney, Agent, or Firm*—Brian E. Szymanski

(57) ABSTRACT

A fluoropolymer having a melting point of at least 160° C. is provided wherein the fluoropolymer is derived from tetrafluoroethylene as the major component, one or more perfluoro vinyl ethers as the minor component, the perfluoro vinyl ether having the formula $CF_2=CFO(CF_2)_nOR_f$, wherein n is from 2 to 6 and $R_f$ is a perfluoroalkyl group having 1 to 6 carbon atoms, and optionally a perfluoro alkyl vinyl ether having from 1 to 5 carbon atoms in the alkyl radical.

7 Claims, No Drawings

FLUOROPOLYMERS FROM TETRAFLUOROETHYLENE AND PERFLUORO(ALKOXYALKYL VINYL) ETHER

The present invention relates to fluoropolymers which have a melting point of at least 160° C. and which are prepared from tetrafluoroethylene (TFE), from perfluoro vinyl ethers, and also, where appropriate, from conventional olefinic comonomers, such as hexafluoropropylene (HFP), or olefins which contain hydrogen or contain chlorine.

These fluoropolymers are either thermoplastic or are not processable in the melt despite their possession of a melting point.

Typical representatives of thermoplastically processable TFE copolymers are copolymers made from TFE and from perfluoro (alkyl vinyl) ethers (PAVE) having from 1 to 3 carbon atoms in the alkyl radical, in particular perfluoro (n-propyl vinyl) ether (PPVE-1) (U.S. Pat. No. 3,132,123). Such copolymers are commercially available under the designation "PFA". Starting from a comonomer content of about 2% by weight PAVE, these partially crystalline copolymers have outstanding technical performance, for example extraordinary chemical stability combined with high service temperatures. The previously known and used PFA products are copolymers made from TFE and from PPVE-1 (U.S. Pat. No. 3,635,926) as well as terpolymers made from TFE/PPVE-1 and HFP (DE-A-26 39 109). Copolymer products which contain perfluoro ethyl vinyl ether (WO-A-97/07147) or perfluoro methyl vinyl ether (U.S. Pat. No. 4,864,006) in place of PPVE-1 are also to be found in the literature. However, these copolymers have low flexural fatigue strength and low flexibility, and therefore have little suitability for corrugated tubing applications.

Another commonly used and thermoplastically processable material is fluorinated ethylene-propylene copolymer (FEP) (U.S. Pat. No. 2,946,763, U.S. Pat. No. 2,955,099, U.S. Pat. No. 3,085,083). These copolymers are not highly resistant with regard to thermal or chemical stress cracking, or to flexural fatigue properties. These properties are improved by incorporating PPVE-1 (DE-A-27 10 501) into the FEP. However, a relatively large amount of PPVE-1 is needed in order to achieve a rational property profile, and this is very costly (EP-A-75 312). The amount can be reduced by using relatively long-chain vinyl ethers, in particular by incorporating perfluoro 2-propoxypropyl vinyl ether (PPVE-2). PPVE-2 is only cost-effectively usable in non-aqueous polymerization (EP-A-75 312). Otherwise the polymerization times are too long to be cost-effective.

Fluorinated thermoplastics tend to degrade thermally when processed. The thermal degradation takes place predominantly via the thermally unstable end groups formed during the polymerization, i.e. from the end of the chain. The mechanism of this degradation has been described in some detail in "Modern Fluoropolymers", John Wiley & Sons, 1997, and in K. Hintzer and G. Löhr, 'Melt Processable Tetrafluorethylene-Perfluoropropylvinyl ether copolymers (PFA)', page 223. During the thermal degradation corrosive gases are produced and considerably impair the quality of the final product via metal contamination or bubble formation, and can corrode tooling and processing machinery. The effect naturally increases as molecular weight falls (a lower melt viscosity). The degradation can be substantially suppressed by converting the thermally unstable end groups into stable $CF_3$ end groups by postfluorination of agglomerate or pelletized melt, for example as described in U.S. Pat. No. 4,743,658 and DE-A-19 01 872. To achieve particularly pure products, a stationary bed of agglomerate may be fluorinated as in U.S. patent application Ser. No. 60/208,626 dated Jun. 1, 2000. For fast extrusion, in accordance with WO-A-99/41313 preference is given to bi- or multimodal molecular weight distributions.

Polytetrafluoroethylene (PTFE) was the first commercially available perfluorinated fluoropolymer, and its property profiles have been continually improved in recent decades. However, its very high molecular weight makes it processable only by sinter techniques or other specialized processing methods, such as paste extrusion. The polymer chains have a linear structure, and this can be highly disadvantageous in applications, since the polymer chains slide over one another when a force is applied. This causes outflow of the PTFE material, a phenomenon known as "cold flow" which is problematic in gasket applications. This problem has been reduced, but not solved, by what is known as modification, i.e. incorporation of comonomers, such as PPVE-1, in amounts of from 0.01 to 0.1% by weight (U.S. Pat. No. 3,855,191). There still remains a need, therefore, to suppress "cold flow" and also to increase weldability.

U.S. Pat. No. 3,817,960 discloses low and high molecular weight copolymers of TFE and a perfluorovinyl ether of the formula $CF_3(CF_2O)_nCF_2CF_2OCF=CF_2$. The low molecular weight copolymers are taught useful as thermally stable oils and greases and the high molecular weight can be used for making molded articles.

U.S. Pat. No. 4,920,170 and U.S. Pat. No. 5,401,818 disclose elastomeric polymers that include certain units derived from fluorovinyl ethers. Typical applications taught for these polymers include molded articles such as gaskets, O-rings, flange seals etc.

It is an object of the present invention to provide a thermoplastically melt processable material which has high flexural fatigue strength, high flexibility and low susceptibility to stress cracking, and secondly to reduce further the "cold flow" of TFE polymer which can be processed through sintering. The polymerization should preferably be carried out in an aqueous medium.

To solve all of these problems, units derived from one or more perfluorovinyl ether comonomers as defined below are incorporated in the fluoropolymer. The perfluorovinyl ether comonomer has a relatively long and relatively mobile, linear side chain, and can conveniently be incorporated into the polymer in an aqueous emulsion polymerization.

In particular, the present invention relates to fluoropolymers that have a melting point of at least 160° C. and that comprise from 60 to 99.99% by weight of units derived from tetrafluoroethylene, from 0 to 30% by weight of units derived from hexafluoropropylene, from 0 to 10% by weight of units derived from other olefinic fluorinated or non-fluorinated monomers, from 0 to 35% by weight of units derived from perfluoro alkyl vinyl ether having from 1 to 5 carbon atoms in the alkyl radical, and from 0.01 to 35% by weight of units derived from one or more perfluoro vinyl ethers of the formula:

$$CF_2=CF[O(CF_2)_n]_m(OCF_2)_xOR_f \qquad [I]$$

where
n is an integer from 2 to 6,
m is an integer from 1 to 3,
x is an integer from 0 to 4, and
$R_f$ is a perfluoroalkyl group having from 1 to 6 carbon atoms.

In a particular embodiment of the invention, the fluoropolymer has between 65% by weight and 99.99% by weight of units derived from tetrafluoroethylene. In a further embodiment, the fluoropolymer has between 70% by weight and 99.99% by weight of units derived from tetrafluoroethylene and between 0.01% by weight and 30% by weight of units derived from perfluorovinyl ethers of formula [I]. Typically, the amount of units of perfluorovinyl ethers of formula [I] will be between 0.1% by weight and 15% by weight, preferably between 0.3% by weight and 10% by weight. It will be understood that if the fluoropolymer is a copolymer of only TFE and the perfluorovinyl ether(s) of formula [I], the remaining units will be TFE. If the fluoropolymer is a copolymer of TFE, the perfluorovinyl ether(s) of formula [I] and further comonomers other than the perfluorovinyl ether(s) of formula [I], the amounts of TFE and the further comonomers should be as set forth above.

In one embodiment of the invention, the fluoropolymer is thermoplastically melt processable and can thus readily be used to make extruded articles. By the term "thermoplastically melt processable" is meant that the fluoropolymer has a sufficiently low melt viscosity such that the melt of the fluoropolymer can be processed by typically available extrusion equipment. Generally, the melt flow index at 372° C. measured as set forth in the examples, should be more than 0, preferably at least 0.1 so as to achieve a thermoplastically melt processable fluoropolymer.

Thus, in a particular aspect, the invention also relates to a method of making an extruded article with the aforementioned fluoropolymers and to extruded articles such as films, tubes, hoses and cables having the fluoropolymer as an insulating medium.

According to the invention it has been found that the use of even small amounts of units derived from the comonomer of formula (I), whose side chain is linear, long and flexible markedly improves flexural fatigue strength, flexibility, and chemical and thermal stress cracking performance. Like PPVE-1, but unlike the branched material PPVE-2, perfluoro 3-methoxy-n-propyl vinyl ether (PMPVE) which has the following formula $$F_2C=CF-O-CF_2-CF_2-CF_2-O-CF_3$$

or perfluoro 2-methoxyethyl vinyl ether (PMEVE) which has the formula $$F_2C=CF-O-CF_2-CF_2-O-CF_3$$

in particular can be copolymerized with TFE in aqueous emulsion polymerization. In comparison with PPVE-1, the side chain in PMPVE and PMEVE is longer, and in comparison with PPVE-2 the side chain in PMPVE and PMEVE is more mobile. Used as "modifiers" in PTFE, PMPVE and PMEVE cause a substantially greater reduction in the "cold flow" of such products, and to an improvement in their weldability. The unbranched side chain is significant. Other preferred comonomers with a long mobile, linear side chain are:

$$F_2C=CF-O-CF_2-CF_2-O-CF_2-CF_3,$$

$$F_2C=CF-O-CF_2-CF_2-CF_2-O-CF_2-CF_3,$$

which can be prepared as in U.S. patent application Ser. No. 09/470,497, filed on Dec. 22, 1999, $$F_2C=CF-O-CF_2-CF_2-O-CF_2-O-CF_3,$$

$$F_2C=CF-O-CF_2-CF_2-(O-CF_2)_2-O-CF_3,$$

$$F_2C=CF-O-CF_2-CF_2-(O-CF_2)_3-O-CF_3,$$

$$F_2C=CF-O-CF_2-CF_2-(O-CF_2)_4-O-CF_3,$$

which can be prepared as in DE-A-22 15 401 or U.S. Pat. No. 3,692,843.

The long mobile, linear side chains improve the property profile of fluorinated thermoplastics, and also of PTFE products modified with the comonomer of formula [I].

Compared with a conventional PFA product with the same melting point, a copolymer of the invention is more flexible, i.e. has lower stiffness, and the product has a smaller spherolite structure. This can be seen from the markedly lower modulus of elasticity (119 MPa) of a copolymer of TFE and PMPVE, compared with a conventional PFA with a modulus of elasticity of 137 MPa at 120° C. Flexural fatigue strength tests revealed a marked improvement in this property in the fluoropolymer in comparison with a PFA. Indeed, a PMPVE containing polymer has a flexural fatigue strength 20% higher than that of a known PFA product. There is a reduction by a factor of ~10 in spherolite structure for the same melting point. Its average value is 3 μm. This directly affects the surface structure of hose, specifically giving a very low surface roughness on the internal wall. This has hitherto been possible only by way of an additional nucleation (U.S. Pat. No. 5,473,018) or as in the German Patent Application 199 64 006.8 of Dec. 30, 1999, which is not a prior publication, by way of the additional incorporation of PPVE-2 into the PFA. Surface roughness is an increasingly important factor in the supply of ultrahigh-purity media, since lower roughness reduces cleaning cost, in particular reducing conditioning times, and produces less microbacterial growth.

A FEP copolymer modified with a perfluorovinyl ether monomer of formula [I], for example an FEP polymer modified with PMPVE is more resistant than an unmodified FEP or a PPVE-1-modified FEP grade to media which cause stress cracking. This difference can be illustrated using the elongation at 200° C. An FEP product modified with PMPVE has 600% higher elongation at 200° C. than a comparable FEP copolymer. This is of particular interest for the use of FEP materials as electrical insulation in what are known as "Local Area Networks" (LAN). Here, besides non-combustibility and good dielectric properties, the insulation is also required to have resistance to high temperatures. It is possible to achieve markedly better values for the mechanical data at high temperatures with a relatively small content of "modifier". Indeed, 0.1 mol % of PMPVE in the FEP gives an elongation at break at 200° C. which is higher than with 0.25 mol % of PPVE-1 in the FEP.

Accordingly, in a particular embodiment, the present invention provides a copolymer having a melting point of at least 240° C., having from 80 to 99.99% by weight of units derived from tetrafluoroethylene, from 1% to 15% by weight, of units derived from hexafluoropropylene, from 0 to 10% by weight of units derived from other olefinic fluorinated or non-fluorinated monomers, from 0 to 18.99% by weight of units derived from perfluoro alkyl vinyl ether having from 1 to 5 carbon atoms in the alkyl radical, and from 0.01 to 19% by weight of units derived from one or more perfluoro vinyl ethers of the formula:

$$CF_2=CF[O(CF_2)_n]_m(OCF_2)_xOR_f \qquad [I]$$

where
n is an integer from 2 to 6,
m is an integer from 1 to 3,
x is an integer from 0 to 4, and
$R_f$ is a perfluoroalkyl group having from 1 to 6 carbon atoms.

A terpolymer composed of TFE, HFP and a perfluorovinyl ether of formula [I], e.g. PMPVE, and having a melting point of 285° C. or more has better flexural fatigue strengths than a corresponding terpolymer made from TFE/HFP and PPVE-1. Indeed, incorporating the same weight of ether comonomer units of formula [I] gives a terpolymer product whose flexural fatigue strength is 35% higher using PMPVE than can be achieved using PPVE-1. The effect of the long and mobile side chain of PMPVE is clearly seen in the lower modulus of elasticity, only 114 MPa at 120° C., compared with 123 MPa for a terpolymer comprising PPVE-1. This novel material is easy to process and gives a very smooth inner surface when producing hose. In addition, this material has high transparency.

At increased proportions of comonomers HFP and comonomers according to formula [I], e.g. PMPVE, products can be prepared which have melting points of from 160 to 220° C. and have excellent suitability as processing aids for blown film production, or as a coating material or insulating material in gasoline hose. These materials have high chemicals resistance, low permeability and good flexibility, together with favorable processing conditions. These properties are preferably achieved using a perfluorinated polymer chain and a high proportion of "modifier".

To improve chemical and physical binding to hydrogen-containing polymers, it is preferable to include up to 10% by weight of a hydrogen-containing comonomer such as for example ethylene, propylene or vinylidene fluoride. This binding is of interest in producing gasoline hose, and there is only an insignificant increase here in the permeability of the fluoropolymer. The low-melting products produced according to the invention have markedly better mechanical properties than the known low-melting FEP grades (EP-A-656 912 and EP-A-731 814).

To give the fluoropolymer better resistance to thermal degradation, and also to improve their performance and processing properties for certain relevant applications, the thermally unstable end groups produced by the polymerization may be converted into thermally stable —$CF_3$ end groups by reaction with fluorine.

Modification of PTFE with PMPVE rather than PPVE-1 or HFP increases long-term flexural strength and gives a smoother surface. The significantly lower deformation under load ("cold flow") should be emphasized.

Deformation under load plays a decisive part in the use of PTFE as a gasket material, its use being preferred because of its chemicals resistance and heat resistance. If the deformation is excessive, the PTFE material can be expelled, and this in turn causes leaks. A PTFE material with low "cold flow" ensures markedly greater reliability and serviceability in these applications.

In tensile creep tests at room temperature with tensile stresses of 3 MPa, 5 MPa and 7 MPa, this PMPVE-modified PTFE material has an elongation after 100 h of only 50% of that of PPVE-1-modified PTFE grades, and only 25% of that of unmodified PTFE grades. The "cold flow" is therefore drastically reduced in the modified PTFE material, and this is advantageous in gasket applications. In addition, a PMPVE-modified PTFE material can be welded and thermoformed, and is therefore particularly well suited to inner linings in pipes or in containers.

The PTFE modified material for use in a gasket application or for use as inner lining in pipes or containers is typically a copolymer of TFE and one or more comonomers of formula [I] above wherein the amount of TFE is between 98.5% by weight and 99.99% by weight and whereby the amount of the comonomers according to formula [I] is between 0.01% by weight and 1.5% by weight. Such a PTFE modified material will typically have a melting point of at least 315° C. and may not be melt processable but will be processable through sinter techniques or paste extrusion.

The copolymers according to the invention can conveniently prepared through aqueous emulsion polymerization of appropriate amounts of the composing monomers or through suspension. The obtained polymer dispersion after aqueous emulsion polymerization can be used as such or if higher solids are desired, can be upconcentrated. Alternatively, the dispersion may be agglomerated to produce the polymer in agglomerate form. Agglomerates will typically have an average size of 1 to 5 mm. If the agglomerates obtained from agglomerating the dispersion are too small, it may be desirable to compact the agglomerate to produce a compacted agglomerate which will typically have an average size of 1 to 10 mm. Still further, if the polymer is melt processible, the polymer may be melted, extruded and cut into granulates of a desired size. The latter may be called melt granulate.

Test Methods:

The content of perfluorinated comonomers (U.S. Pat. No. 4,029,868, U.S. Pat. No. 4,552,925) and the number of end groups (EP-A-226 668, U.S. Pat. No. 3,085,083) are determined by IR spectroscopy, using a Nicolet Magna 560 FTIR. The total of the end groups is calculated from the isolated and bonded COOH, $CONH_2$ and COF groups. PMPVE is likewise determined via the IR spectrum. For this, the quotient calculated from the signals at wavelengths 998/2365 $cm^{-1}$ is converted using the factor 2.6 to obtain the proportion of PMPVE by weight.

The melt index (melt flow index, MFI) gives the amount of a melt in grams per 10 min which is extruded from a feed cylinder through a die under a piston loaded with weights. The dimensions of die, piston, feed cylinder and weights have been standardized (DIN 53735, ASTM D-1238). All of the MFIs mentioned here were determined using a 2.1 mm die with a length of 8 mm, for an applied weight of 5 kg and a temperature of 372° C.

Flexural fatigue strength tests are carried out on films of 1.0 mm thickness. The device used here is model 956, No. 102 from Frank, year of construction 1967. The film strips required to determine flexural fatigue strength are 15 mm wide and have a minimum length of 100 mm. For the test, adhesive strips are used to hold a piece of film of approximately DIN A5 size onto the drum of a film cutter, a draw-knife system is put in place and the cutting drum is rotated to manufacture strips at the given knife separation. The film strips are clamped into the screw clamps of the flexural fatigue machine, and loaded with an attached weight of 1529.6 g. The freely suspended film strips are flexed in both directions to an angle of 90° at the clamping system, with a flexing frequency of 250 double-flexures per minute, until fracture occurs. The number of double-flexures here is recorded by a counter located above the tester. The figure given is the number of double-flexures before the film fractures. The flexural fatigue strength of a material is calculated as the average value of the number of double-flexures from the three measurement locations available on each occasion.

The spherolites were measured on pressure-sintered plaques of 2 mm thickness, produced within a period of 30 min at 360° C. To this end, microtome sections were prepared from these pressure-sintered plaques and studied by optical microscopy.

The tensile creep test to DIN 53444 serves to determine deformation and strength performance. The test specimens used have a thickness of 1 mm and are as described for test specimen No.5 in DIN 53455, but their width is only 12.55 mm (UL fire test specimen) rather than 15 mm as in the standard. The free clamped length was 100 mm. The tests were carried out at room temperature (23° C.) on a Zwick 1445 universal testing machine, using a prescribed stress. The elongation in percent was measured after 100 h.

The complex modulus of elasticity was determined on test specimens stamped out from pressure-sintered plaques and having a thickness of 1 mm, a length of 30 mm and a width of 6 mm. A dynamic-mechanical-thermal spectrometer from Gabo was used for the tests, in the temperature range from −100 to 250° C.

The tensile test for determining elongation at break at 200° C. was carried out on a Zwick universal testing machine. The test was carried out to DIN 53455 on dumbbell specimens to ASTM D 1708, stamped out from pressure-sintered plaques.

The examples below describe the invention in greater detail. Percentages and ratios given are based on weight unless otherwise stated.

EXAMPLE 1

25 l of deionized water are charged to a polymerization reactor with a total volume of 40 l, provided with an impeller stirrer. The reactor is sealed, and the atmospheric oxygen removed by cycles of evacuation and nitrogen-flushing, and the vessel is heated to 63° C. After evacuation, 122 g of ammonium perfluorooctanoate in the form of a 30% strength solution are added to the vessel. 180 g of PMPVE are then pumped in. TFE is then set, with stirring, until the total pressure has reached 13.0 bar. 19 g of methylene chloride are then added into the vessel. The polymerization is initiated by pumping in 2 g of ammonium peroxodisulfate (APS), dissolved in 100 ml of deionized water. As soon as the pressure starts to fall, TFE and PMPVE are supplemented by introducing the gases in a feed ratio PMPVE/TFE of 0.04, so that the total pressure of 13.0 bar is maintained. The heat generated is dissipated by cooling the vessel wall, keeping the temperature constant at 63° C. After a total of 7.2 kg of TFE has been fed into the reactor, the monomer feed is interrupted, the pressure in the reactor is released, and it is flushed several times with $N_2$. This gives a copolymer which has a PMPVE content of 3.6%, a melting point of 312° C. and an MFI of 1.8.

4 kg of product are charged to a 5 l stainless steel reactor, and nitrogen at 130° C. is used to heat the reactor and to flush the same until no air is present. A mixture of 20% of fluorine and 80% of nitrogen is then passed into the reactor for 5×30 min. After the fluorination, the reactor is nitrogen-flushed until a fluorine sensor (0.01 ppm) no longer indicates fluorine. The resultant fluorinated product still has 5 thermally unstable end groups.

| | MFI (372/5) | Cycles | Modulus of elasticity at 120° C. (MPa) | Spherolite diameter in μm |
|---|---|---|---|---|
| Example 1 | 1.8 | 21780 | 119 | 3 |

COMPARATIVE EXAMPLE 1

The polymerization is carried out as described in example 1, except that on this occasion PPVE-1 is utilized instead of PMPVE, with a PPVE-1/TFE feed ratio of 0.042. This gives a copolymer which has a PPVE-1 content of 4.0%, a melting point of 308° C. and an MFI of 1.9. The resultant product is also subjected to fluorination as described in example 1 in such a way that 4 thermally unstable end groups are still present after the fluorination.

| | MFI (372/5) | Cycles | Modulus of elasticity at 120° C. (MPa) | Spherolite diameter in μm |
|---|---|---|---|---|
| Comparative example 1 | 1.9 | 16641 | 137 | 24 |

Compared with a PFA product from comparative example 1, a copolymer product from example 1, prepared using PMPVE, has higher flexural fatigue strength, lower modulus of elasticity and small spherolites. It is therefore possible to prepare a flexible, thermoplastic, perfluorinated copolymer which is superior to conventional PFA products in terms of flexibility.

EXAMPLE 2

25 l of deionized water are charged to a polymerization reactor with a total volume of 40 l, provided with an impeller stirrer. The reactor is sealed, and the atmospheric oxygen removed by cycles of evacuation and nitrogen-flushing, and the vessel is heated to 70° C. After evacuation, 240 g of ammonium perfluorooctanoate in the form of a 30% strength solution are added to the vessel. 90 g of PMPVE are then pumped in. 0.13 bar of ethane is then added into the vessel, with stirring. TFE is then immediately fed until the pressure reaches 9 bar, and HFP is then applied under pressure until the total pressure of 17.0 bar has been reached. The polymerization is initiated by pumping in 8 g of APS, dissolved in 100 ml of deionized water. As soon as the pressure starts to fall, TFE, PMPVE and HFP are supplemented by introducing the gases in a feed ratio PMPVE/TFE of 0.02 and an HFP/TFE feed ratio of 0.05, so that the total pressure of 17.0 bar is maintained. The heat generated is dissipated by cooling the vessel wall, keeping the temperature constant at 70° C. After a total of 10 kg of TFE has been fed into the reactor, the monomer feed is interrupted, the pressure in the reactor is released, and it is flushed several times with $N_2$. The resultant terpolymer has an HFP content of 5.2%, a PMPVE content of 1.8%, a melting point of 287° C. and an MFI (372/5) of 10.1.

| | MFI (372/5) | Cycles | Modulus of elasticity at 120° C. (MPa) |
|---|---|---|---|
| Example 2 | 10.1 | 2980 | 114 |

COMPARATIVE EXAMPLE 2

The polymerization is carried out as described in example 2, except that on this occasion PPVE-1 is utilized instead of PMPVE, with a PPVE-1/TFE feed ratio of 0.02. This gives 7.0 kg of a copolymer which has a PPVE-1 content of 2.0%, an HFP content of 5.0%, a melting point of 286° C. and an MFI of 8.0.

|  | MFI (372/5) | Cycles | Modulus of elasticity at 120° C. (MPa) |
|---|---|---|---|
| Comparative Example 2 | 8.0 | 2150 | 123 |

When compared with a terpolymer from comparative example 2, prepared using PPVE-1, a terpolymer from example 2, prepared using PMPVE, gives a more flexible product with higher flexural fatigue strength and lower modulus of elasticity.

EXAMPLE 3

25 l of deionized water are charged to a polymerization reactor with a total volume of 40 l, provided with an impeller stirrer. The reactor is sealed, and the atmospheric oxygen removed by cycles of evacuation and nitrogen-flushing, and the vessel is heated to 70° C. After evacuation, 240 g of ammonium perfluorooctanoate in the form of a 30% strength solution are added to the vessel. TFE is then fed until the pressure reaches 6.5 bar, followed by application of HFP under pressure until the total pressure of 17.0 bar has been reached. The polymerization is initiated by pumping in 65 g of APS, dissolved in 100 ml of deionized water. As soon as the pressure starts to fall, TFE, PMPVE and HFP are supplemented by introducing the gases in a feed ratio PMPVE/TFE of 0.01 and an HFP/TFE feed ratio of 0.1 1, so that the total pressure of 17.0 bar is maintained. The heat generated is dissipated by cooling the vessel wall, keeping the temperature constant at 70° C. After a total of 10 kg of TFE has been fed into the reactor, the monomer feed is interrupted, the pressure in the reactor is released, and it is flushed several times with $N_2$. The resultant terpolymer has an HFP content of 13.1%, an PMPVE content of 0.6%, a melting point of 260° C. and an MFI (372/5) of 28.

COMPARATIVE EXAMPLE 3

The polymerization is carried out as described in example 3, but this time only using HFP, with an HFP/TFE feed ratio of 0.13. This gives a copolymer which has an HFP content of 14.5%, a melting point of 255° C. and an MFI of 27.0.

COMPARATIVE EXAMPLE 4

The polymerization is carried out as described in example 3, except that this time PPVE-1 is utilized instead of PMPVE, with a PPVE-1/TFE feed ratio of 0.01. This gives a copolymer which has a PPVE-1 content of 1.0%, an HFP content of 13.0%, a melting point of 259° C. and an MFI of 25.

The incorporation of PMPVE into an FEP product as in example 3 gives an improvement of about 600% in elongation at break at 200° C. in comparison with an unmodified FEP product from comparative example 3. Marked advantages when using PMPVE are also seen in comparison with PPVE-1 modified FEP product from comparative example 4. Flexural fatigue strength has been increased by about 30% when PMPVE rather than PPVE-1 has been used as "modifier".

TABLE 1

(Comparison of PMPVE-and PPVE-1-modified FEP products, and comparison with a standard FEP product)

|  | MFI (372/5) | Cycles | Elongation at break at 200° C. (%) |
|---|---|---|---|
| Example 3 | 28 | 760 | 260% |
| Comparative Example 3 | 25 | 490 | 41% |
| Comparative Example 4 | 27 | 570 | 190% |

EXAMPLE 4

25 l of deionized water are charged to a polymerization reactor with a total volume of 40 l, provided with an impeller stirrer. The reactor is sealed, and the atmospheric oxygen removed by cycles of evacuation and nitrogen-flushing, and the vessel is heated to 70° C. After evacuation, 600 g of ammonium perfluorooctanoate in the form of a 30% strength solution are added to the vessel. 300 g of PMPVE, 12 bar of HFP and 5 bar of TFE are then fed, with stirring, so that the total pressure of 17.0 bar is achieved. The polymerization is initiated by pumping in 20 g of APS, dissolved in 100 ml of deionized water. As soon as the pressure starts to fall, TFE, PMPVE and HFP are supplemented by introducing the gases in a feed ratio PMPVE/TFE of 0.06 and an HFP/TFE feed ratio of 0.15, so that the total pressure of 17.0 bar is maintained. The heat generated is dissipated by cooling the vessel wall, keeping the temperature constant at 70° C. After a total of 10 kg of TFE has been fed into the reactor, the monomer feed is interrupted, the pressure in the reactor is released, and it is flushed several times with $N_2$. The resultant terpolymer has an HFP content of 17%, a PMPVE content of 6.5%, a melting point of 195° C. and an MFI (372/5) of 100.

EXAMPLE 5

25 l of deionized water are charged to a polymerization reactor with a total volume of 40 l, provided with an impeller stirrer. The reactor is sealed, and the atmospheric oxygen removed by cycles of evacuation and nitrogen-flushing, and the vessel is heated to 63° C. 20 g of PMPVE, 5 bar of nitrogen and 10 bar of TFE are then fed, so that the total pressure of 15.0 bar is achieved. The polymerization is initiated by pumping in 12 g of APS, dissolved in 100 ml of deionized water. As soon as the pressure starts to fall, TFE and PMPVE are supplemented by introducing the gases in a ratio PMPVE/TFE of 0.004, so that the total pressure of 15.0 bar is maintained. The heat generated is dissipated by cooling the vessel wall, keeping the temperature constant at 63° C. After a total of 10 kg of TFE has been fed into the reactor, the monomer feed is interrupted, the pressure in the reactor is released, and it is flushed several times with $N_2$. This gives a PTFE product which has a PMPVE content of 0.04%, a melting point of 341° C. and an SSG of 2.165.

COMPARATIVE EXAMPLE 5

The polymerization is carried out as described in example 5, but on this occasion only TFE is utilized. This gives a PTFE product with a melting point of 343° C. and an SSG of 2.16.

COMPARATIVE EXAMPLE 6

The polymerization is carried out as described in example 5, except that on this occasion PPVE-1 is utilized instead of PMPVE in the feed supply. This gives a PTFE product which has a PPVE-1 content of 0.04%, a melting point of 344° C. and an SSG of 2.165.

Compared with a PPVE-1-modified PTFE product from comparative example 6, the elongations of the inventive product from example 5 are about 100% lower after 100 h at tensile stresses of 3 MPa, 5 MPa and 7 MPa. Compared with an unmodified PTFE product from comparative example 5, the elongation is indeed about 400% lower. The inventive products from example 5, PMPVE-modified PTFE products, therefore show markedly lower tendency to deform under load, to exhibit what is known as "cold flow", than previously known PTFE grades from comparative examples 5 and 6. This gives substantial performance advantages, particularly in uses in gasket materials.

TABLE 2

(Comparison of elongation after 100 h in PMPVE- and PPVE-1-modified PTFE products, and comparison with an unmodified PTFE)

| | % elongation 3 MPa/100 h | % elongation 5 MPa/100 h | % elongation 7 MPa/100 h | Comonomer in % |
|---|---|---|---|---|
| Example 5 | 0.41 | 1.29 | 3.66 | 0.04 |
| Comparative Example 5 | 1.32 | 4.04 | 14.55 | 0 |
| Comparative Example 6 | 0.87 | 2.28 | 6.36 | 0.04 |

The invention claimed is:

1. A polymer having a melting point of at least 160° C., having from 60 to 99.99% by weight of units derived from tetrafluoroethylene, from 0 to 30% by weight of units derived from hexafluoropropylene, from 0 to 10% by weight of units derived from other olefinic fluorinated or non-fluorinated monomers, from 0 to 35% by weight of units derived from perfluoro alkyl vinyl ether having from 1 to 5 carbon atoms in the alkyl radical, and from 0.01 to 35% by weight of units derived from one or more unbranched perfluoro vinyl ethers of the formula:

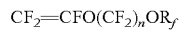

$$CF_2=CFO(CF_2)_nOR_f$$

where n is an integer from 2 to 6 and $R_f$ is a perfluoroalkyl group having from 1 to 6 carbon atoms.

2. A polymer according to claim 1 wherein the amount of units derived from tetrafluoroethylene is between 65% by weight and 99.99% by weight.

3. A polymer according to claim 1 wherein the amount of units derived from tetrafluoroethylene is between 70% by weight and 99.99% by weight and the amount of units derived from said perfluorovinyl ethers is between 0.01% by weight and 30% by weight.

4. The polymer as claimed in claim 1, wherein the perfluoro vinyl ether has the formula $CF_2=CF-O(-CF_2)_2-OCF_3$ or $CF_2=CF-O(-CF_2)_3-OCF_3$.

5. The polymer as claimed in claim 1, having less than 70 end groups other than $-CF_3$ per $10^6$ carbon atoms.

6. The polymer as claimed in claim 1 in the form of an agglomerate, melt granulate, compacted agglomerate or aqueous dispersion.

7. A method for producing a polymer as claimed in claim 1 wherein (i) tetrafluoroethylene, (ii) one or more perfluoro vinyl ethers of the formula:

$$CF_2=CFO(CF_2)_nOR_f$$

where n is an integer from 2 to 6 and $R_f$ is a perfluoroalkyl group having from 1 to 6 carbon atoms, and (iii) optionally one or more further olefinic fluorinated or non-fluorinated monomers and or a perfluoro alkyl vinyl ether having from 1 to 5 carbon atoms in the alkyl radical, are copolymerized through aqueous emulsion polymerization or suspension polymerization in the appropriate amounts so as to obtain a polymer as defined in claim 1.

* * * * *